(12) United States Patent
Bool, III et al.

(10) Patent No.: US 6,394,043 B1
(45) Date of Patent: May 28, 2002

(54) OXYGEN SEPARATION AND COMBUSTION APPARATUS AND METHOD

(75) Inventors: Lawrence E. Bool, III, Hopewell Junction; Hisashi Kobayashi, Putnam Valley, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/739,281

(22) Filed: Dec. 19, 2000

(51) Int. Cl.$^7$ .............................................. B01D 53/22
(52) U.S. Cl. ......................... 122/488; 122/5; 122/31.1; 96/8; 95/54
(58) Field of Search ............................. 122/5, 31.1, 34, 122/235.32, 488, 489, 491; 96/8, 10, 234, 243; 95/54

(56) References Cited

U.S. PATENT DOCUMENTS

| | | | |
|---|---|---|---|
| 5,567,398 A | 10/1996 | Ruhl et al. | 422/197 |
| 5,820,655 A | 10/1998 | Gottzmann et al. | 95/54 |
| 5,837,125 A | 11/1998 | Prasad et al. | 205/763 |
| 5,888,272 A | 3/1999 | Prasad et al. | 95/54 |
| 6,139,810 A | * 10/2000 | Gottzmann et al. | 96/8 |
| 6,153,163 A | * 11/2000 | Prasad et al. | 423/246 |
| 6,168,650 B1 | * 1/2001 | Buxbaum | 96/10 |
| 6,293,084 B1 | * 9/2001 | Drnevich et al. | 96/8 |

OTHER PUBLICATIONS

Ochi, "Key Technologies for High Performance Boiler", Proceedings of Forum on High Performance Industrial Furnace and Boiler, Tokyo, Japan, Mar. 8–9, 1999.

* cited by examiner

*Primary Examiner*—Gregory Wilson
(74) *Attorney, Agent, or Firm*—David M. Rosenblum

(57) ABSTRACT

An oxygen separation and combustion apparatus such as a boiler or a nitrogen generator in which a plurality of fluid passages and oxygen transport membranes are located within a combustion chamber. The oxygen transport membranes separate oxygen from an oxygen containing gas, thereby to provide the oxygen within the combustion chamber to support combustion of a fuel and thereby to generate heat. The fluid passages are positioned to allow a portion of the heat to be transferred from the combustion to the oxygen transport membranes to heat said oxygen transport membranes to an operational temperature and a further portion of the heat to be transferred from the combustion to the fluid, thereby to heat the fluid and also, to help stabilize the operational temperature of said oxygen transport membranes. Fuel is introduced into the combustion chamber by injection or as a mixture with circulated flue gas. The fuel is introduced into the combustion chamber and the combustion products are discharged so that said combustion products flow in a direction predominantly parallel to said membranes.

18 Claims, 2 Drawing Sheets

OXYGEN SEPARATION AND COMBUSTION APPARATUS AND METHOD

FIELD OF THE INVENTION

The present invention relates to a oxygen separation and combustion apparatus and method that can be applied to such devices as a boiler or a nitrogen generator in which oxygen separated from an oxygen containing gas by oxygen transport membranes supports combustion of a fuel within a combustion chamber and temperature of the oxygen transport membranes is controlled by fluid circulating within fluid passages passing through the combustion chamber.

BACKGROUND OF THE INVENTION

Growing concerns about environmental issues, such as global warming and pollutant emissions, are driving industries to explore new ways to increase efficiency and reduce emissions of pollutants. This is particularly true for fossil fuel fired combustion systems, which represent one of the largest sources of carbon dioxide and air pollution emissions. One effective way to reduce emissions and to increase efficiency is to use oxygen, or oxygen enriched air, in the combustion process. The use of oxygen or oxygen enriched air reduces stack heat losses, which increases the system efficiency, while at the same time reducing NOx emissions. Further, the concentration of carbon dioxide in the flue gas is higher since there is little or no nitrogen to act as a diluent. The higher carbon dioxide concentration enhances carbon dioxide recovery options. Oxygen use in the prior art has been limited to those processes with high exhaust temperatures, such as glass furnaces. In such applications, the fuel savings and the benefits achieved are greater than the cost of the oxygen. In low exhaust temperature systems, such as boilers, the reverse is true. In these systems, the cost of oxygen produced with current technologies is more expensive than the available fuel savings. This makes oxygen use in such systems economically unattractive. Moreover, when the energy required to produce the oxygen is taken into consideration, the overall thermal efficiency decreases.

Oxygen transport membranes have been advantageously utilized in the prior art to produce oxygen for heat consuming oxygen separation and combustion apparatus and processes in a manner that results in a savings of energy that would otherwise have to be expended in the separation of oxygen. Oxygen transport membranes are fabricated from oxygen-selective, ion transport ceramics in the form of tubes or plates that are in themselves impervious to the flow of oxygen and other gases. Such ceramics, however, exhibit infinite oxygen selectivity at high temperatures by transporting oxygen ions through the membrane. In oxygen transport membranes, the oxygen is ionized on one surface of the membrane to form oxygen ions that are transported through the membrane. The oxygen ions on the opposite side of the membrane recombine to form oxygen with the production of electrons. Depending upon the type of ceramic, oxygen ions either flow through the membrane to ionize the oxygen or along separate electrical pathways within the membrane, or by an applied electric potential. Such solid electrolyte membranes are made from inorganic oxides, typified by calcium- or yttrium-stabilized zirconium and analogous oxides having fluoride or perovskite structures.

In U.S. Pat. No. 5,888,272 oxygen transport membranes are integrated into a combustion process itself, with all the oxygen produced going directly into the combustor. The heated flue gases can then be routed to a process wherein the thermal energy can be used to heat a fluid or perform useful work. In one embodiment, flue gases are recycled through a bank of oxygen transport membrane tubes and enriched with oxygen. Typically the flue gas enters the bank containing anywhere from 1 to about 3 percent oxygen and leaves the bank containing from about 10 to about 30 percent oxygen by volume. The enriched flue gas is then sent to a combustion space where it is used to burn fuel. In another embodiment, called reactive purge, the oxygen transport membrane tubes are placed directly in the combustion space. A fuel diluted with flue gas is passed through the tubes and combust with the oxygen as it passes through the tubes. Thus oxygen production and combustion take place simultaneously.

As will be discussed, the present invention utilizes oxygen transport membranes to produce oxygen to support combustion within a oxygen separation and combustion apparatus such as a boiler in a manner that inherently reduces the energy expenditures involved in compressing an incoming oxygen containing feed to the membranes. The advantages of the present invention will become apparent from the following discussion.

SUMMARY OF THE INVENTION

In one aspect, the present invention provides an oxygen separation and combustion apparatus comprising a plurality of parallel oxygen transport membranes located within a combustion chamber. The plurality of parallel oxygen transport membranes serve to separate oxygen from an oxygen containing gas, thereby to provide the oxygen within the combustion chamber to support combustion of a fuel and generate heat. A plurality of fluid passages pass through the combustion chamber and are positioned so that a portion of the heat of combustion is transferred from the combustion to the oxygen transport membranes to heat the oxygen transport membranes to an operational temperature and a further portion of the heat is transferred from the combustion to the fluid passages to provide heat to heat the fluid and to promote stabilization of the operational temperature of the oxygen transport membranes. At least one inlet is provided for introducing at least the fuel into the combustion chamber and an exhaust from the combustion chamber discharges combustion products arising from combustion of the fuel. The exhaust and the at least one inlet are spaced apart from one another so that the combustion products flow in a direction predominantly parallel to the oxygen transport membranes.

The oxygen transport membranes and the fluid passages can be of tubular configuration. The direction of flow of the combustion products can either be countercurrent or co-current to gas flow of the oxygen containing gas within the oxygen transport membranes. Preferably, the oxygen transport membranes are closed at one end and open at the end to discharge an oxygen-depleted retentate and a plurality of coaxial lance tubes project into open ends of the oxygen transport membranes to supply the oxygen containing gas thereto. The at least one inlet can comprise an inlet to the combustion chamber for introducing a mixture of the fuel and a flue gas, if flue gas is required, into the combustion chamber. Alternatively, in case of open ended, tubular oxygen transport membrane units, the at least one inlet can comprise fuel nozzles located adjacent to the open ends of the oxygen transport membranes.

The fluid can be water and thus, the fluid heater can be a boiler. In such case, the fluid passages are interspersed between the oxygen transport membranes and the fluid passages and the oxygen transport membranes are parallel to one another. Preferably, the fluid passages communicate between fluid inlet and outlet manifolds to supply the fluid to the fluid passages and to discharge steam therefrom, respectively. In such case, the oxygen transport membranes project, from the open end thereof, from a retentate outlet manifold to discharge oxygen depleted air and the lance tubes project from an air inlet manifold.

In another aspect, the present invention provides an oxygen separation and combustion method in which an oxygen containing gas is introduced into a plurality of parallel oxygen transport membranes located within a combustion chamber. Oxygen is separated from the oxygen containing gas within the plurality of parallel oxygen transport membranes, thereby to provide oxygen within the combustion chamber. A fuel is introduced into the combustion chamber and the fuel is combusted within the combustion chamber in the presence of the oxygen to generate heat. The fluid is passed through a plurality of fluid passages also located within the combustion chamber and combustion products are discharged from the combustion chamber. The combustion products are discharged from the combustion chamber and the fuel is introduced so that the combustion products flow in a direction predominantly parallel to the oxygen transport membranes to provide a reactive purge to promote the separation of the oxygen from the oxygen containing gas. The fluid passages are positioned so that a portion of the heat is transferred from the combustion to the oxygen transport membranes to heat the oxygen transport membranes to an operational temperature and a further portion of the heat is transferred from the combustion to the fluid passages to provide heat to heat the fluid and to promote stabilization of the operational temperature of the oxygen transport membranes. The fluid can be water that is heated.

In either of the foregoing aspects of the present invention, and as used herein and in the claims, the term "heated," means transferring heat to the fluid and thereby raising its temperature. Further, the term, "water" encompasses both water in liquid form and steam or a two-phase mixture of water and steam. Thus, as used herein and in the claims, the term, "heated" when used in connection with water means raising the temperature of the water by any amount. As such, the temperature rise of water may or may not be sufficient to raise steam and if the water enters the heat transfer passages as steam, the steam will become superheated.

The integration of the oxygen transport membranes and the combustion system described above dramatically reduces the power requirement for oxygen production. The oxygen flux through an oxygen transport membrane is approximately proportional to the log of the partial pressure ratio between the source side and the product side, if mass transfer rate is controlled by the membrane itself. For example, to produce pure oxygen at one atmosphere absolute, the air must be compressed to about fifteen atmospheres. This results in a net energy requirement of approximately 160 kW/ton assuming expansion of the oxygen depleted air. Although this power requirement is less than conventional equipment, which is closer to 200 KW/ton, integrated the oxygen transport membrane unit with the combustion system of the boiler reduces this energy requirement still further by providing a reactive purge to consume the oxygen as it passes through the membrane. Such oxygen consumption produces an oxygen concentration on the product side of the oxygen transport membrane that is therefore always near zero. This provides such a large driving force that requires only minimal compression, typically just enough to move the air through the oxygen transport membrane. This can be accomplished with a blower instead of a more expensive compressor.

In a tubular membrane, since the largest driving force for oxygen separation occurs at the entry point of the air or other oxygen containing gas to the membrane, a countercurrent flow of combustion products provides a more fuel-rich and therefore oxygen lean conditions at the opposite end of the membrane, where less driving force is present, to further enhance the effect of the reactive purge.

Since fuel, flue gas and combustion products exist as a mixture within the combustion chamber, the fuel is diluted so that the driving force of the diffusion of the fuel to the surface of the oxygen transport membrane is reduced. At the same time, the oxygen flux through the membrane is low enough that, by in large, fuel rich conditions are encountered. Therefore, combustion of the fuel can be said to take place at or near the surface of the membrane. This of course depends on the degree of dilution.

The result of the location of the combustion in apparatus and methods in accordance with the present invention produces a heat of combustion that can cause a thermal runaway of the oxygen transport membrane resulting in damage and premature failure. In the present invention, the heat transfer passages, which can be interspersed steam tubes, act to withdraw the heat and thereby help stabilize the operational temperature of the oxygen transport membranes.

A further advantage that may be obtained from the present invention is a potential for a high degree of integration. Since the oxygen is produced at the point of use, no oxygen-safe piping is required. Further the energy required to heat the air and the fuel-flue gas mixture to the optimal operation temperature of the oxygen transport membrane comes directly from the oxygen transport membrane without concomitant heat loses that would otherwise occur with external piping. The integration also minimized the boiler/heater size and complexity. Since oxygen is produced in the unit, no other space is required for an on-site conventional air separation system. The location of the oxygen transport membranes and heat transfer passages within a combustion chamber also helps to minimize the overall footprint of a fluid heater of the present invention.

Another major benefit that may be obtained from the present invention is that high purity nitrogen can be produced as a byproduct. The high driving forces for oxygen transport allow for the production of such nitrogen with little or no oxygen. Furthermore, a fluid heater in accordance with the present invention will produce very little NOx since combustion takes place in the presence of oxygen instead of air. Since the oxygen is gradually added to the fuel-flue gas mixture as it passes through the combustion chamber, the combustion takes place under fuel rich conditions. Hence, the combustion is inherently staged with a long residence time in the fuel-rich regime, and with slow transition from fuel rich to fuel lean combustion to also lessen the possibility of NOx formation.

BRIEF DESCRIPTION OF THE DRAWINGS

Although the present invention concludes with claims distinctly pointing out the subject matter that Applicants regards as their invention, it is believed that the invention will be better understood when taken in connection with the accompanying drawings in which:

In order to avoid repetition of explanation of elements serving the same function within the various embodiments of the present invention, the same reference numerals are used in the figures where such elements are illustrated.

DETAILED DESCRIPTION

Figure 1:
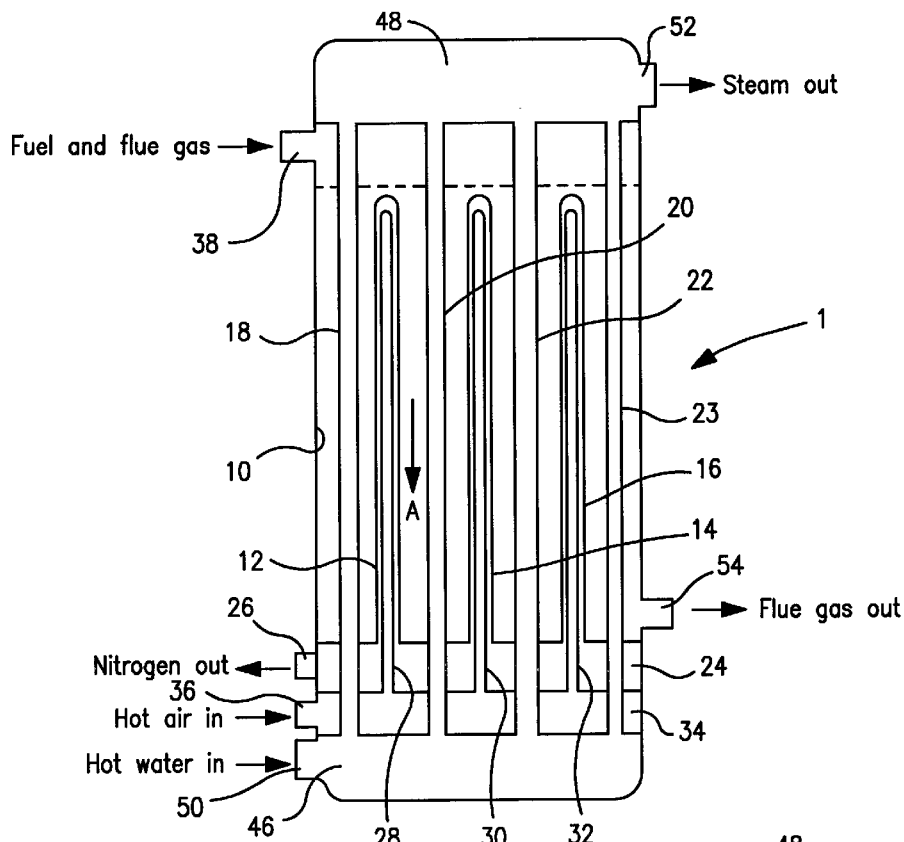
FIG. 1 is a schematic illustration of a boiler in accordance with the present invention.

With reference to FIG. 1 a boiler 1 in accordance with the present invention is illustrated. It is to be noted that although the present invention is discussed in connection with a boiler, the present invention is not so limited. A boiler is but a single application of an oxygen separation and combustion apparatus in accordance with the present invention. Other fluids could be heated such as petroleum products or the fluid passages could contain methane, steam and a suitable steam reforming catalyst. The object of an oxygen separation and combustion apparatus of the present invention might not be to heat a fluid, but rather to generate a nitrogen product. In such case any suitable heat transfer fluid might be utilized.

Boiler 1 is provided with a combustion chamber 10 and a plurality of parallel oxygen transport membranes 12, 14 and 16 located within combustion chamber 10. A plurality of parallel fluid passages 18, 20, 22, and 23 pass through combustion chamber 10. Combustion of fuel, for instance, methane or natural gas, in the presence of oxygen produced by oxygen transport membranes 12, 14, and 16 produces heat to heat water circulating within fluid passages 18, 20, 22, and 23.

Oxygen transport membranes 12, 14 and 16 are preferably in the form of open ended tubes connected to a retentate outlet manifold 24 having an outlet 26. Lance tubes 28, 30 and 32 project into open ends of oxygen transport membranes 12, 14 and 16, respectively, to supply the oxygen containing gas thereto. In this regard lance tubes 28, 30 and 32 are connected to an air inlet manifold 34 having an inlet 36. Heated air enters inlet 36 and air inlet manifold 34 then distributes the air to lance tubes 28, 30 and 32. The air flows from the closed ends of oxygen transport membranes 12, 14 and 16 towards the open ends thereof as indicated by arrow head A. Oxygen in the form of oxygen ions permeate through oxygen transport membranes 12, 14 and 16 and is discharged into combustion chamber 10.

Although tubular oxygen transport membranes 12, 14 and 16 are illustrated plate-like elements could be substituted. Additionally, although fluid passages 18, 20, 22, and 23 are also illustrated as being parallel to one another and to oxygen transport membranes 12, 14, and 16, other configurations are possible. For instance, fluid passages 18, 20, 22, and 23 could be at right angles to their illustrated orientation or possibly spiral around respective oxygen transport membranes 12, 14, and 16.

A mixture of fuel and flue gas is introduced into combustion chamber 10 by means of a fuel inlet 38. The fuel combusts at the surfaces of oxygen transport membranes 12, 14 and 16 to produce heat and combustion products to form the flue gas. The resultant heat, heats oxygen transport membrane elements 12, 14 and 16 to their operational temperature while at the same time also supplying heat to fluid passages 18, 20, 22, and 23 which are connected at opposite ends to fluid inlet and outlet manifolds 46 and 48. Heated water is introduced into an inlet 50 of fluid inlet manifold 40. Water then passes through fluid passages 18, 20, 22, and 23 to generate steam that is expelled from an outlet 52 of fluid outlet manifold 48.

The flue gas is discharged from combustion chamber 10 through a flue gas outlet 54. Although not illustrated, part of the flue gas discharged from flue gas outlet 54 is cooled, circulated by a blower and then mixed with the fuel. The mixture is then introduced into inlet 38. The spacing between inlet 38 and flue gas outlet 54 cause the flue gas and therefore the combustion products to pass in any direction parallel to oxygen transport membranes 12, 14 and 16.

Although only a single row of fluid passages 18, 20, 22, and 23 and a single row of oxygen transport membranes 12, 14 and 16 are illustrated, it is particularly advantageous that a plurality of such rows be supplied so that each of the oxygen transport membranes 12, 14 and 16 is surrounded by fluid passages such as 18, 20, 22, and 23 to conduct the heated combustion to the fluid passages and help stabilize the operational temperature of the oxygen transport membranes 12, 14 and 16.

Figure 2:
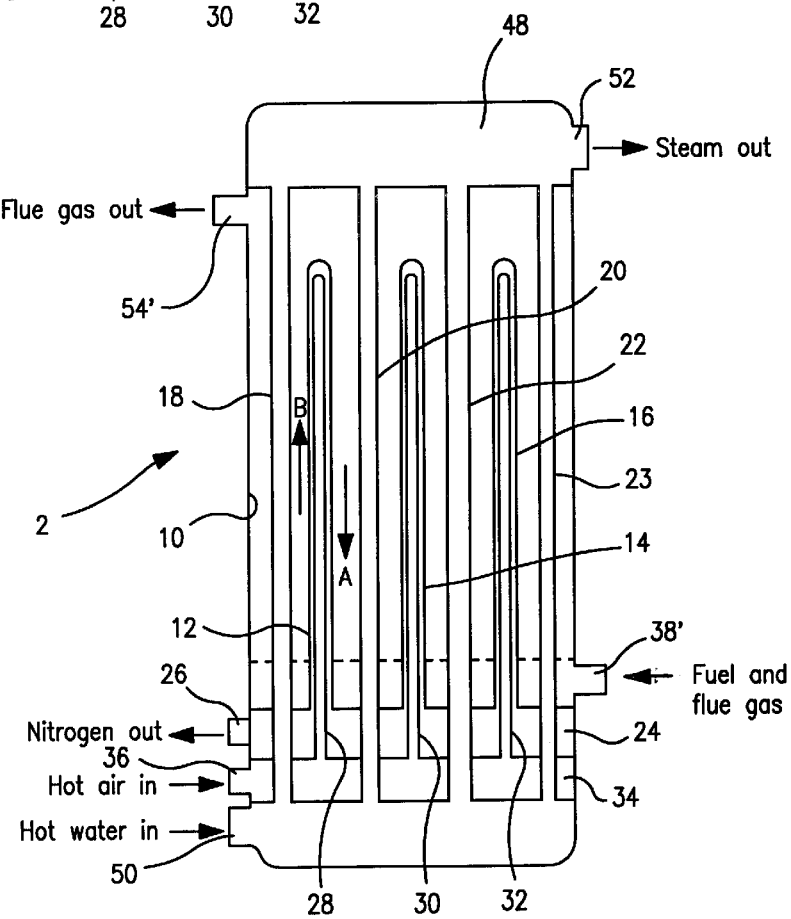
FIG. 2 is a is a schematic illustration of an alternative embodiment of a boiler in accordance with the present invention.

With reference to FIG. 2, a boiler 2 in accordance with the present invention is illustrated. The difference between boiler 2 and boiler 1 is that the inlet 38 to the combustion chamber and the exhaust 54 have been reversed as inlet 38' and exhaust 54' so that now the flue gas predominately moves in a direction indicated by arrow head "B" which is countercurrent to the direction of the air (arrow head "A") within oxygen transport membrane elements 12, 14 and 16. As such, at the closed end of the tubular oxygen transport membrane elements 12, 14 and 16, there exists the highest oxygen concentration and therefore the highest driving force in the air itself. As air travels in the direction of arrow head "A", towards retentate outlet manifold 26, the oxygen concentration within each oxygen transport membrane unit 12, 14 and 16 is progressively less. However, fuel is entering at the open end of oxygen transport membranes 12, 14 and 16 where the least driving force is provided. However, at such point, the combustion is fuel rich and therefore the greatest driving force is provided by the reactive purge at such location.

Figure 3:
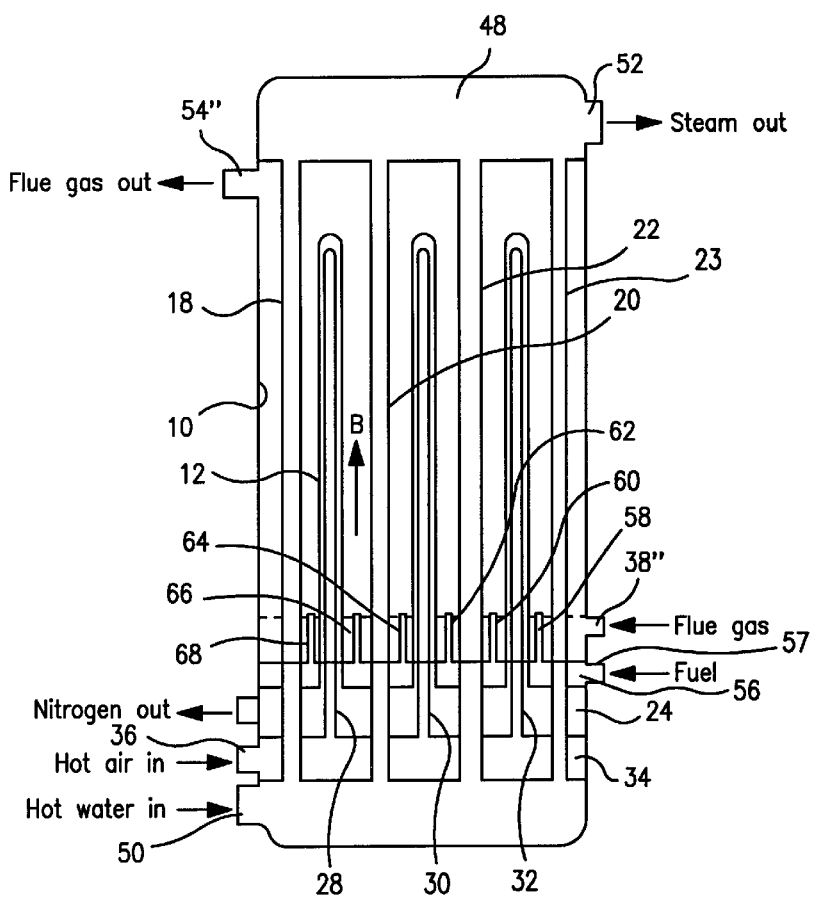
FIG. 3 is a schematic illustration of a further alternative embodiment of a boiler in accordance with the present invention.

With reference to FIG. 3, the fuel is introduced into combustion chamber 10, separately from the flue gas, by a series of fuel inlets is provided by a fuel inlet manifold 56 having a fuel inlet 57 and fuel injectors 58, 60, 62, 64, 66, and 68 connected thereto. Fuel is sprayed into the combustion chamber 10 in the countercurrent direction (arrowhead "B") to provide the greatest reactive purge effect at the open end of the oxygen transport membrane elements, 12, 14 and 16 where the least amount of driving force toward the separation exists within the particular membranes. Flue gas is introduced into combustion chamber 10 through flue gas inlet 38" and is discharged from exhaust 54". Although not illustrated, part of the flue gas discharged from exhaust 54" can be circulated back to flue gas inlet 38" by use of a high temperature blower.

In many type of oxygen transport membranes, the flux of oxygen through the membrane increases as the membrane temperature increases. The combustion reaction at the surface, and therefore the heat release at the surface, is therefore limited by the oxygen flux through the membrane. However, poor temperature control can lead to catastrophic thermal runaway of the membrane. As the temperature increases more oxygen passes through the membrane leading to higher combustion rates at the surface and still higher membrane temperatures until the temperature limitations of the membrane is exceeded.

In any configuration of oxygen transport membranes, involving the combustion of fuel at or near the surface of a membrane, the dominant form of heat transfer resulting from the combustion will be by radiation. The arrangement of fluid passages and oxygen transport membranes must be designed and employed so that the fluid passages will be capable of sufficiently absorbing the radiant heat that thermal runaway is prevented and therefore, the desired membrane operational temperature is maintained.

Figure 4:
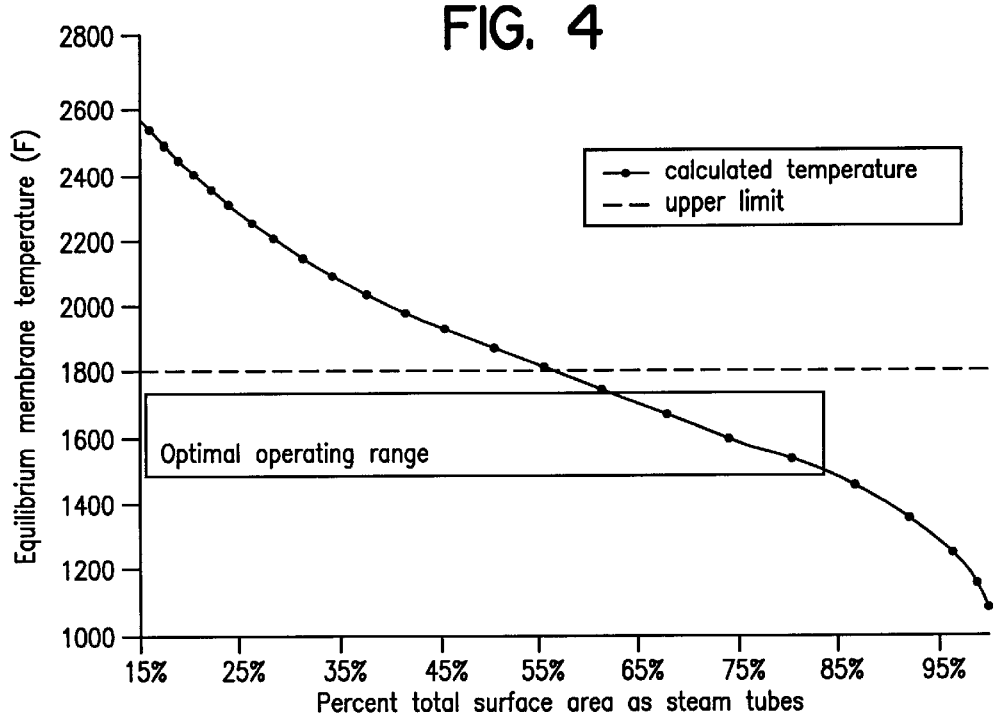
FIG. 4 is a graphical illustration of an example in accordance with the present invention showing the requisite ratio of oxygen transport membrane area to steam tube area for thermal control of the membranes.

With reference to FIG. 4, a calculated example is shown of an oxygen transport membrane of tubular form surrounded by six fluid passages containing water. For purposes of the example, the oxygen transport membrane was assumed to have an oxygen flux of 20 scfh/ft$^2$ throughout the optimum operating range. Both the fluid passages and the oxygen transport membrane acted as black bodies with the field of view between the oxygen transport membranes and the surrounding fluid passages estimated by the crossed string method. The combustion flux for the membrane was set at 9000 BTU/ft$^2$ and the fluid passage temperature was fixed at 400° F. The upper limit of the operating range of the membrane is that temperature at which the membrane will fail. The lower limit is the temperature at which the membrane will cease to function. As illustrated, the fluid passages must constitute at least about 58% of the total surface area of the membranes and the fluid passages to prevent the membrane from overheating. At the other extreme, a ratio of greater than about 85% leads to excessive cooling of the membranes.

Although the present invention has been described with reference to preferred embodiments, as will occur to those skilled in the art, numerous changes and omissions may be made without departing from the spirit of the present invention.

We claim:

1. A oxygen separation and combustion apparatus comprising:
   a combustion chamber;
   a plurality of parallel oxygen transport membranes located within said combustion chamber to separate oxygen from an oxygen containing gas, thereby to provide the oxygen within the combustion chamber to support combustion of a fuel and thereby generate heat;
   a plurality of fluid passages passing through said combustion chamber;
   said fluid passages positioned so that a portion of the heat is transferred from the combustion to said oxygen transport membranes to heat said oxygen transport membranes to an operational temperature and a further portion of the heat is transferred from the combustion to said fluid passages to provide heat to heat fluid and to promote stabilization of the operational temperature of said oxygen transport membranes;
   at least one inlet for introducing at least the fuel into said combustion chamber; and
   an exhaust from said combustion chamber to discharge combustion products arising from combustion of the fuel;
   the exhaust and said at least one inlet spaced apart from one another so that said combustion products flow in a direction predominantly parallel to said oxygen transport membranes.

2. The apparatus of claim 1, wherein said oxygen transport membranes and said fluid passages are of tubular configuration.

3. The apparatus of claim 2, wherein said direction is countercurrent to gas flow of the oxygen containing gas within said oxygen transport membranes.

4. The apparatus of claim 2, wherein said direction is co-current to gas flow of the oxygen containing gas within said oxygen transport membranes.

5. The apparatus of claim 2, wherein:
   the oxygen transport membranes are closed at one end and open at the end to discharge an oxygen-depleted retentate; and
   a plurality of coaxial lance tubes project into open ends of said oxygen transport membranes to supply the oxygen containing gas thereto.

6. The apparatus of claim 5, wherein said direction is countercurrent to gas flow of the oxygen containing gas within said oxygen transport membranes.

7. The apparatus of claim 5, wherein said direction is co-current to gas flow of the oxygen containing gas within said oxygen transport membranes.

8. The apparatus of claim 6 or claim 7, wherein said at least one inlet comprises an inlet to said combustion chamber for introducing a mixture of the fuel and a flue gas into said combustion chamber.

9. The apparatus of claim 8, wherein said fluid is water.

10. The apparatus of claim 9, wherein:
    said fluid passages are interspersed between said oxygen transport membranes and said fluid passages and said oxygen transport membranes are parallel to one another;
    said fluid passages communicate between fluid inlet and outlet manifolds to supply fluid to said fluid passages and to discharge fluid therefrom, respectively;
    said oxygen transport membranes project, from said open end thereof, from a retentate outlet manifold to discharge oxygen depleted air; and
    said lance tubes project from an air inlet manifold.

11. The apparatus of claim 10, wherein:
    said fluid passages are interspersed between said oxygen transport membranes and said fluid passages and said oxygen transport membranes are parallel to one another;
    said fluid passages communicate between fluid inlet and outlet manifolds to supply fluid to said fluid passages and to discharge fluid therefrom, respectively;
    said oxygen transport membranes project, from said open end thereof, from a retentate outlet manifold to discharge oxygen depleted air; and
    said lance tubes project from an air inlet manifold.

12. The apparatus of claim 7, wherein said at least one inlet comprise fuel nozzles located adjacent to the open ends of said oxygen transport membranes.

13. The apparatus of claim 12, wherein said fluid is water.

14. An oxygen separation and combustion method comprising:
    introducing an oxygen containing gas into a plurality of parallel oxygen transport membranes located within a combustion chamber;
    separating oxygen from the oxygen containing gas within the plurality of parallel oxygen transport membranes, thereby to provide oxygen within the combustion chamber;
    introducing fuel into the combustion chamber;
    combusting the fuel within the combustion chamber in the presence of the oxygen to generate heat;
    passing a fluid through a plurality of fluid passages located within the combustion chamber;

discharging combustion products from the combustion chamber;

the combustion products being discharged from the combustion chamber and the fuel being introduced so that the combustion products flow in a direction predominantly parallel to said oxygen transport membranes to provide a reactive purge to promote the separation of the oxygen from the oxygen containing gas; and the fluid passages being positioned so that a portion of the heat is transferred from the combustion to said oxygen transport membranes to heat said oxygen transport membranes to an operational temperature and a further portion of the heat is transferred from the combustion to said fluid passages to provide heat to heat the fluid and to promote stabilization of the operational temperature of said oxygen transport membranes.

15. The method of claim 14, wherein said oxygen transport membranes and said fluid passages are of tubular configuration.

16. The method of claim 14, wherein said direction is countercurrent to gas flow of the oxygen containing gas within said oxygen transport membranes.

17. The method of claim 14, wherein said direction is co-current to gas flow of the oxygen containing gas within said oxygen transport membranes.

18. The method of claim 14 or claim 16 or claim 17, wherein said fluid is water.

* * * * *